United States Patent
Lee et al.

(10) Patent No.: US 10,861,619 B2
(45) Date of Patent: Dec. 8, 2020

(54) ELECTRIC VEHICLE CHARGING CABLE

(71) Applicant: LS CABLE & SYSTEM LTD., Anyang-si (KR)

(72) Inventors: Jae Bok Lee, Seoul (KR); Do Hyun Park, Anyang-Si (KR); Chul Min Kim, Suwon-Si (KR); Hyun Woong Kim, Suwon-Si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 0 days.

(21) Appl. No.: 16/486,379

(22) PCT Filed: Feb. 21, 2018

(86) PCT No.: PCT/KR2018/002112
§ 371 (c)(1),
(2) Date: Aug. 15, 2019

(87) PCT Pub. No.: WO2018/155895
PCT Pub. Date: Aug. 30, 2018

(65) Prior Publication Data
US 2020/0234853 A1    Jul. 23, 2020

(30) Foreign Application Priority Data
Feb. 21, 2017   (KR) .......................... 10-2017-0022729

(51) Int. Cl.
*H01B 3/30*       (2006.01)
*B60L 50/60*      (2019.01)
(Continued)

(52) U.S. Cl.
CPC ............... *H01B 3/30* (2013.01); *B60L 50/60* (2019.02); *B60L 53/18* (2019.02); *B60L 53/302* (2019.02);
(Continued)

(58) Field of Classification Search
CPC ...... H01B 7/423; H01B 3/445; H01B 7/0216; H01B 9/003; B60R 53/302; B60R 53/18
See application file for complete search history.

(56) References Cited

U.S. PATENT DOCUMENTS 1,866,611 A * 7/1932 Affel .................. H01B 11/1882
                                                 174/14 R
5,412,304 A * 5/1995 Abbott .................... H02J 7/025
                                                     320/108
(Continued)

FOREIGN PATENT DOCUMENTS

JP         S44-4273      2/1944
JP         H11-102781    4/1994
(Continued)

OTHER PUBLICATIONS

International Search Report for related International Application No. PCT/KR2018/002112; report dated Aug. 30, 2018; (3 pages).
(Continued)

*Primary Examiner* — Timothy J Thompson
*Assistant Examiner* — Michael F McAllister
(74) *Attorney, Agent, or Firm* — K&L Gates LLP (57) ABSTRACT

The present invention relates to an electric vehicle charging cable capable of effectively cooling heat, which is generated therein during charging of an electric vehicle, using a cooling fluid, preventing damage to internal components thereof due to heat, and minimizing a diameter of the cable.

16 Claims, 6 Drawing Sheets

(51) Int. Cl.
*B60L 53/302* (2019.01)
*B60L 53/18* (2019.01)
*H01B 3/44* (2006.01)
*H01B 7/02* (2006.01)
*H01B 7/42* (2006.01)
*H01B 9/00* (2006.01)

(52) U.S. Cl.
CPC .......... *H01B 3/445* (2013.01); *H01B 7/0216* (2013.01); *H01B 7/423* (2013.01); *H01B 9/003* (2013.01)

(56) References Cited

U.S. PATENT DOCUMENTS

| | | | | |
|---|---|---|---|---|
| 5,591,937 | A * | 1/1997 | Woody | B60L 53/302 |
| | | | | 174/5 R |
| 6,220,955 | B1 * | 4/2001 | Posa | F21V 29/56 |
| | | | | 454/184 |
| 8,098,044 | B2 * | 1/2012 | Taguchi | B60L 53/66 |
| | | | | 320/109 |
| 9,233,618 | B2 * | 1/2016 | Dyer | B60L 50/40 |
| 9,287,646 | B2 * | 3/2016 | Mark | G06F 1/20 |
| 10,629,331 | B2 * | 4/2020 | Sato | H01B 7/00 |
| 2012/0043935 | A1 * | 2/2012 | Dyer | B60L 50/66 |
| | | | | 320/109 |
| 2014/0221213 | A1 * | 8/2014 | Fukuda | H02G 1/081 |
| | | | | 505/163 |
| 2015/0217654 | A1 * | 8/2015 | Woo | H02J 7/0029 |
| | | | | 320/109 |
| 2017/0028862 | A1 * | 2/2017 | Nagel | H01B 9/006 |
| 2017/0338006 | A1 * | 11/2017 | Gontarz | B60L 3/00 |

FOREIGN PATENT DOCUMENTS

| | | |
|---|---|---|
| JP | 9-50719 | 2/1997 |
| JP | 10-106867 | 4/1998 |
| JP | 2003194267 A | 7/2003 |
| JP | 2013059211 A | 3/2013 |
| JP | 2013099024 A | 5/2013 |
| JP | 6078198 | 1/2017 |
| KR | 20100126833 A | 12/2010 |
| KR | 1020150000821 | 1/2015 |
| KR | 20150101221 A | 9/2015 |
| KR | 1020160119147 | 10/2016 |

OTHER PUBLICATIONS

Written Opinion for related International Application No. PCT/KR2018/002112; report dated Aug. 30, 2018; (7 pages).

Korean Office Action for related Korean Application No. 10-2017-0022729; action dated Jul. 24, 2019; (8 pages).

Japanese Office Action for related Japanese Application No. 2019-544916; action dated Sep 23, 2020; (6 pages).

* cited by examiner

ELECTRIC VEHICLE CHARGING CABLE

CROSS-REFERENCE TO RELATED APPLICATIONS

The present application is a National Stage of International Application No. PCT/KR2018/002112, filed Feb. 21, 2018, which claims priority to Korean Application No. 10-2017-0022729, filed Feb. 21, 2017, the disclosure of which are incorporated herein by reference.

TECHNICAL FIELD

The present invention relates to an electric vehicle charging cable having a cooling function. More specifically, the present invention relates to an electric vehicle charging cable capable of effectively cooling heat, which is generated therein during charging of an electric vehicle, using a cooling fluid, preventing damage to internal components thereof due to heat, and minimizing a diameter of the cable.

BACKGROUND

With the spread of electric vehicles, installation of electric vehicle chargers is increasing. In addition, quick chargers for quick charging within a short time have become widespread. Unlike slow charging, an output voltage of a quick charger ranges from 50 V to 450 V DC, an output current thereof reaches 110 A, and it will take only 20 to 30 minutes to charge an electric vehicle through the quick charger. The output current of the quick charger is expected to increase depending on a battery capacity of an electric vehicle and technology for charging electric vehicles.

Electric current is supplied from an electric vehicle charger to an electric vehicle by connecting an electric vehicle charging cable to a main body of such a quick charger, attaching a connector of the charger to an end of the electric vehicle charging cable, and attaching the connector of the charger to an electric vehicle connector included in the electric vehicle.

An output current of the quick charger is 100 A or more and thus the electric vehicle charging cable for transmission of the output current to an electric vehicle is likely to be easily heated. In order to minimize heat generated in the electric vehicle charging cable, a method of increasing a diameter of a conductor of the electric vehicle charging cable or the like may be used, but it is difficult to sufficiently reduce generated heat and the weight of the electric vehicle charging cable increases.

Heat generated in the electric vehicle charging cable may increase a risk of fire. Furthermore, the electric vehicle charging cable is likely to come into contact with a user's body when a charger connector is attached to a connector of an electric vehicle to charge the electric vehicle or is separated from the connector of the electric vehicle and placed in a charger. When an excessive amount of heat is generated in the electric vehicle charging cable, the user may be injured or feel discomfort or anxiety.

DETAILED DESCRIPTION OF THE INVENTION

Technical Problem

The present invention is directed to providing an electric vehicle charging cable capable of effectively cooling heat generated therein during charging of an electric vehicle by using a cooling fluid, preventing damage to internal components thereof due to heat, and minimizing a diameter of the cable.

Technical Solution

According to an aspect of the present invention, the present invention provides an electric vehicle charging cable comprising: a grounding unit; at least one communication unit; a pair of power units each comprising: a conductor with an insulating layer; a cooling tube in which the conductor is accommodated and a cooling fluid flows in a predetermined direction; and a spacer provided between the conductor and an inner surface of the cooling tube to prevent contact between the insulating layer of the conductor and the inner surface of the cooling tube, while the conductor is accommodated in the cooling tube; and an outer jacket covering the grounding unit, the communication unit, and the power units.

And the spacer of the power unit may be in the form of annular wire and may be cross-wound spirally along an outer circumferential surface of the power unit.

And the spacer of the power unit may comprise a plurality of protrusions protruding from an outer surface of the insulating layer of the conductor or the inner surface of the cooling tube.

And at least one of the cooling tube or the spacer may be formed of a Teflon-based material or a urethane material.

And the cooling fluid flowing through the cooling tubes of the power units may be supplied toward a charger connector attached to an end of the electric vehicle charging cable via the cooling tube of one of the pair of power units, and collected near the charger connector via the cooling tube of the other power unit.

And the cooling tubes of the pair of power units may comprise fluid circulation holes at corresponding positions near the charger connector, and the cooling fluid may be collected through a fluid bridge connecting the fluid circulation holes.

And the fluid bridge may comprise parallel through-parts configured to accommodate the cooling tubes of the pair of power units to pass therethrough; and a connection part configured to connect the through-parts for communication between the fluid circulation holes.

And the conductor may be configured to be inserted into a conductor part of the charger connector.

And According to an aspect of the present invention, the present invention provides also an electric vehicle charging cable comprising: a grounding unit; a pair of conductors each including an insulating layer; a pair of cooling tubes each covering one of the conductors not to be contact with the conductors, wherein a cooling fluid flows and circulates in the pair of cooling tubes; and a fluid bridge configured to connect the pair of cooling tubes to supply the cooling fluid supplied via one of the pair of cooling tubes to the other cooling tube.

And the conductor may be accommodated in the cooling tube, and the electric vehicle charging cable further may comprise a spacer between the conductor and the cooling tube.

And at least one of the spacer or the cooling tube may be formed of polytetrafluoro ethylene (PTFE).

And at least one of the spacer or the cooling tube may be formed of a general resin or polyethylene and coated with fluorinated polyethylene.

And the conductor may be inserted into a conductor part of a charger connector attached to an end of the electric vehicle charging cable, and the fluid bridge may be disposed in a housing of the charger connector.

And the cooling fluid supplied from an electric vehicle charger may be supplied toward the charger connector via one of the cooling tubes of the pair of cooling tubes, supplied to the other cooling tube via the fluid bridge, and collected to the electric vehicle charger.

And the pair of cooling tubes may comprise fluid circulation holes at corresponding positions near the charger connector, and the fluid bridge comprises: parallel through-parts configured to accommodate the pair of cooling tubes to pass therethrough;

and a connection part configured to connect the through-parts for communication between the fluid circulation holes.

And the spacer may be in the form of annular wire and is cross-wound spirally about an outer side of the insulating layer of the conductor.

Advantageous Effects

According to an electric vehicle charging cable of the present invention, heat generated in the electric vehicle charging cable during quick charging of an electric vehicle can be efficiently cooled using a cooling fluid.

More specifically, in the electric vehicle charging cable of the present invention, a conductor with an insulating layer is placed inside a cooling tube through which a cooling fluid flows not to be in contact with an inner surface of the cooling tube, thereby maximizing cooling performance of the conductor that generates heat.

In the electric vehicle charging cable of the present invention, the conductor is disposed not in contact with the inner surface of the cooling tube to cool all surfaces of the insulating layer of the conductor, thereby preventing the insulating layer covering the conductor from being locally melted due to a cooling variation of each region thereof.

In the electric vehicle charging cable of the present invention, inner components of a power unit are formed of materials having high heat resistance to minimize external or internal heat transmission, so that users' discomfort or anxiety may be reduced and the inner components may be prevented from being melted when an outer jacket is covered.

In addition, in the electric vehicle charging cable of the present invention, a cooling channel is provided in the power unit, so that a whole diameter of the electric vehicle charging cable may be minimized as compared to technology of providing a cooling tube separately from a power unit.

MODE OF THE INVENTION

Hereinafter, exemplary embodiments of the present invention will be described in detail with reference to the accompanying drawings. The present invention is, however, not limited thereto and may be embodied in many different forms. Rather, the embodiments set forth herein are provided so that this disclosure will be thorough and complete, and fully convey the scope of the invention to those skilled in the art. Throughout the specification, the same reference numbers represent the same elements.

Figure 1:
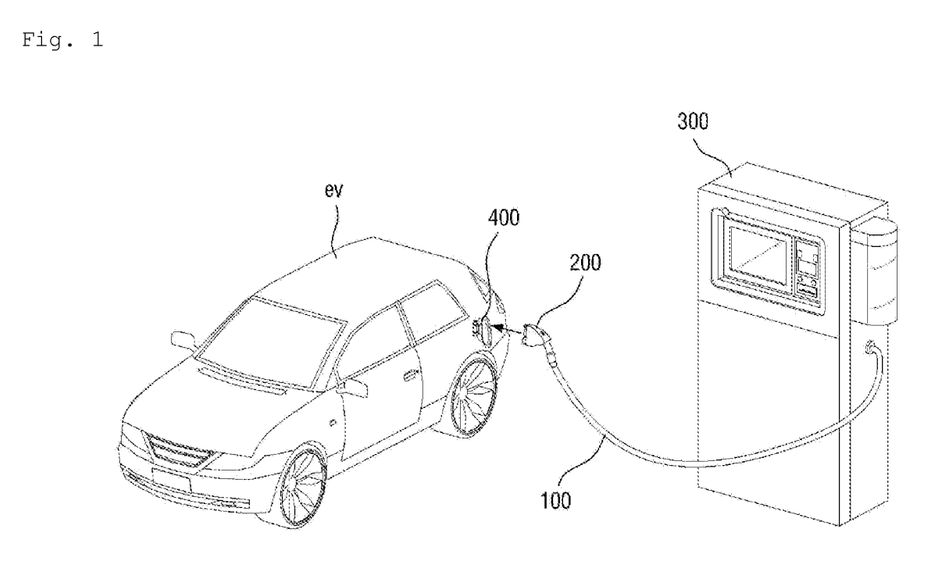
FIG. 1 illustrates an electric vehicle and an electric vehicle charger.

FIG. 1 illustrates an electric vehicle ev and an electric vehicle charger 300.

The electric vehicle charger 300 is connected to a charger connector 200 via an electric vehicle charging cable 100 so as to supply power to the electric vehicle ev. The charger connector 200 is provided on an end of the electric vehicle charging cable 100.

The charger connector 200 may be attached to an electric vehicle connector 400 of the electric vehicle ev to supply power. It may take only 20 to 30 minutes to charge the electric vehicle ev using a quick charger.

Heat may be generated in the electric vehicle charging cable 100 electrically connecting the electric vehicle charger 300 and the electric vehicle ev due to a large current capacity thereof. To prevent a risk of fire or relieve a user's anxiety, a method of cooling the electric vehicle charging cable 100 using a cooling fluid is employed in the electric vehicle charging cable 100 of the present invention.

Figure 2:
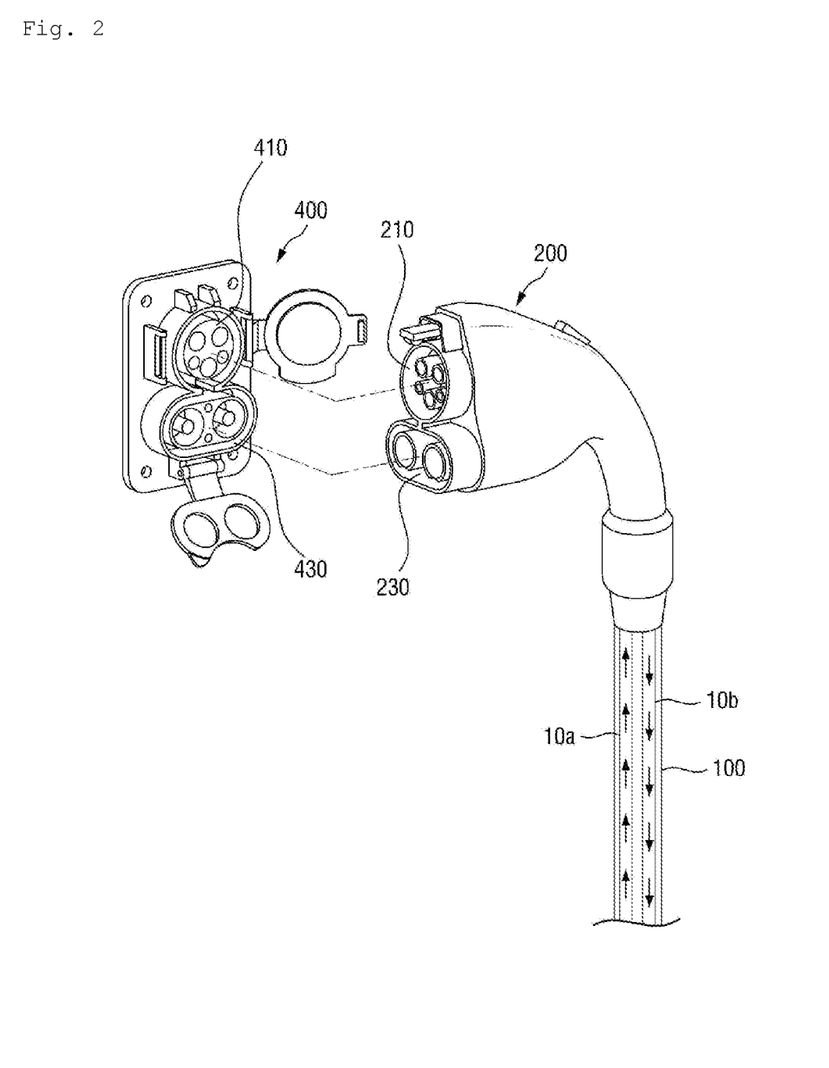
FIG. 2 illustrates an electric vehicle and a connector of an electric vehicle charger.

FIG. 2 illustrates the charger connector 200 to which the electric vehicle connector 400 of the electric vehicle ev and the electric vehicle charging cable 100 are connected. The connector illustrated in FIG. 2 is a 'combo (TYPE1)' connector used in the USA and Europe and determined as a unified standard connector in the future, whereby both AC slow charging and DC quick charging may be performed, and is applicable to the electric vehicle charging cable 100 according to the present invention.

However, a 'CHAdeMO' connector used in Japan or a Renault '3-phase AC' conductor is applicable to the electric vehicle charging cable 100 according to the present invention, as well as the combo ('TYPE1') connector of FIG. 2 used in the USA and Europe.

As illustrated in FIG. 2, the charger connector 200 is attached to an end of the electric vehicle charging cable 100 of the present invention. The charger connector 200 is configured to be detachably attached to the electric vehicle connector 400 of the electric vehicle ev.

The combo ('TYPE1') connector is integrated with an AC or DC connector. These connectors include AC charging parts 210 and 410 and DC charging parts 230 and 430.

The electric vehicle charging cable 100 connected to the connectors is easily heated by high electric current during quick charging and thus cooled with a cooling fluid to fix the problem.

As illustrated in FIG. 2, a pair of power units 10a and 10b are included in the electric vehicle charging cable 100, and a cooling channel 15 is included in each of the power units 10a and 10b, so that the cooling fluid may be supplied via the cooling channel 15 to fix a problem that the electric vehicle charging cable 100 is heated easily. The cooling fluid supplied from the electric vehicle charger 300 via the cooling channels 15 of the pair of power units 10a and 10b is supplied via the cooling channel 15 of the power unit 10*a* or 10*b* and collected via the cooling channel 15 of the other power unit 10*a* or 10*b*. A related art in which a cooling tube through which a cooling fluid flows is provided in an electric vehicle charging cable or a related art in which a cooling channel is provided adjacent to a power unit or a conductor has been introduced. However, because all surfaces of the conductor or the power units 10, which are easily heated, are not cooled, cooling performance may not be satisfactory when the cooling tube is not in direct contact with the power unit or the conductor or in the case of a region not in contact with the cooling channel.

However, in the case of the electric vehicle charging cable 100 according to the present invention, a method of maximizing cooling performance by accommodating each of conductors and the like in one of cooling channels is used. The electric vehicle charging cable 100 according to the present invention will be described in detail with reference to FIG. 3 below.

Figure 3:
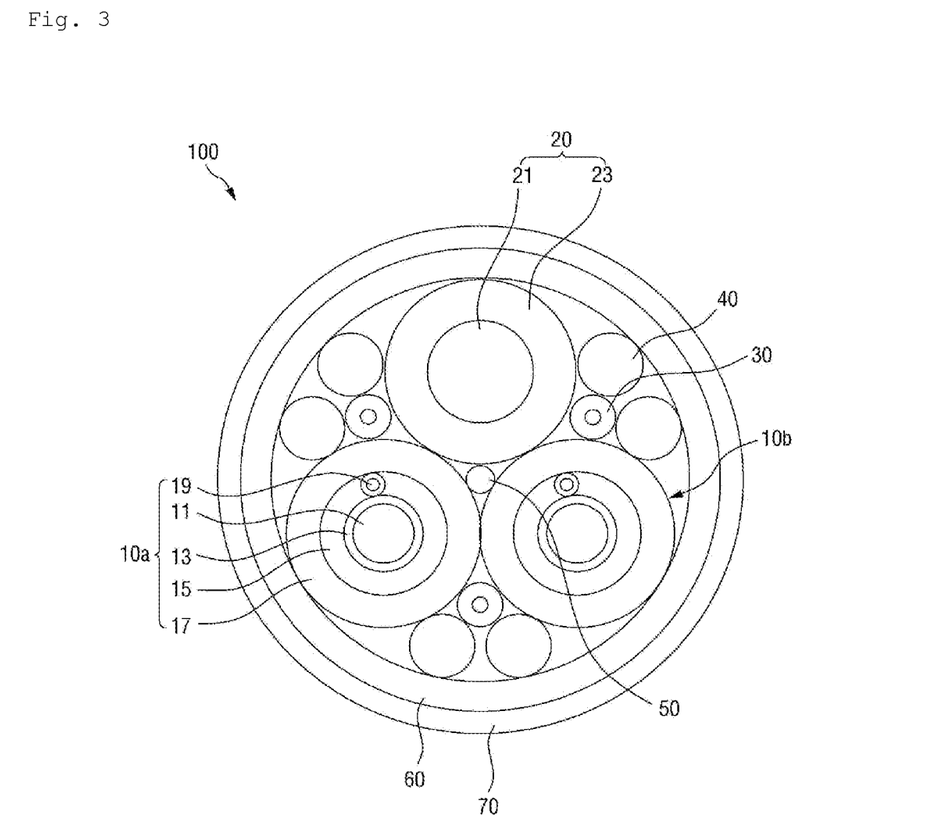
FIG. 3 is a cross-sectional view of an electric vehicle charging cable according to the present invention.

FIG. 3 is a cross-sectional view of an electric vehicle charging cable 100 according to the present invention.

The electric vehicle charging cable 100 of the present invention includes a grounding unit 20; at least one communication unit 30; a pair of power units 10 each including a conductor 11 with an insulating layer 13, a cooling tube 17 in which the conductor 11 is accommodated and a cooling fluid flows in a predetermined direction, and a spacer 19 provided between the conductor 11 and an inner surface of the cooling tube 17 to prevent contact between the insulating layer 13 of the conductor 11 and the inner surface of the cooling tube 17 while the conductor 11 is accommodated in the cooling tube; and an outer jacket 70 configured to accommodate the grounding unit 20, the communication unit 30 and the power units 10.

The electric vehicle charging cable 100 of FIG. 3 may include three communication units 30, one grounding unit 20, and a pair of power units 10*a* and 10*b*.

Each of the communication units 30 and the grounding unit 20 may be coated with a sheath layer. A shaped filler 40 for maintaining a round shape of the cable and a central tensile wire 50 for reinforcing tensile force may be provided.

The pair of power units 10*a* and 10*b* which are easily heated may be cooled by supplying thereto a cooling fluid to circulate through the inside thereof.

Specifically, the power unit 10 includes the conductor 11 having the insulating layer 13, the cooling tube 17 which is configured to accommodate the conductor 11 and in which the cooling fluid flows in the predetermined direction, and the spacer 19 provided between the conductor 11 and the inner surface of the cooling tube 17 to prevent contact between the insulating layer 13 of the conductor 11 and the inner surface of the cooling tube 17 while the conductor 11 is accommodated in the cooling tube 17.

The conductor of the power unit 10 may be accommodated in the cooling tube 17 while the insulating layer 13 is included in the conductor 11. The conductor 11 having the insulating layer 13 and accommodated in the cooling tube 17 may be provided with a cooling channel 15 on an outside thereof to effectively cool heat which may be generated when power is supplied.

The cooling fluid that may be supplied to the cooling tube 17 may be water or the like, and an anti-freeze may be added thereto to prevent freezing when not in use. The electric vehicle charging cable 100 of the present invention connects the electric vehicle charger 300 and the charger connector 200 to each other, and the cooling fluid used for cooling may be collected back to the electric vehicle charger 300, is cooled, and is supplied again.

Thus, a cooling device for re-cooling the cooling fluid and a pumping device for causing the cooling fluid to flow may be provided inside or outside the electric vehicle charger 300.

A conductor with an insulating layer is withdrawn and connected to a charger power supply (not shown) and the cooling fluid flowing through each cooling tube may be supplied from the cooling device and the pumping device and then be re-cooled and pumped to form a circulation channel.

As described above with reference to FIG. 2, the cooling channels 15 of the pair of power units 10*a* and 10*b* may be configured to circulate through the pair of power units 10*a* and 10*b*.

That is, in the electric vehicle charger 300, the cooling fluid, which was used for cooling while circulating through the cooling tube 17 of the power unit and thus is heated, is cooled by the cooling device and pumped by the pumping device to be supplied again into the cooling tube 17, thereby repeatedly and continuously cooling the power unit 10.

That is, the cooled cooling fluid may be supplied to the cooling tube 17 of one of the pair of power units 10*a* and 10*b* of the electric vehicle charging cable 100 connecting the charger connector 200 and the electric vehicle charger 300, and may be collected to the cooling tube 17 of the other power unit 10*a* or 10*b* after the cooling fluid is used for cooling. This process will be described below in detail.

In order to uniformly cool the conductor of the power unit 10, the conductor may be configured such that the cooling fluid may flow along an outer surface of the insulating layer 13 thereof. That is, when the insulating layer 13 of the conductor and an inner surface of the cooling tube 17 come into contact with each other, cooling performance may decrease, and thus, the spacer 19 may be provided to prevent contact between the insulating layer 13 of the conductor and the inner surface of the cooling tube 17, so that the cooling channel 15 may be uniformly provided along an outer side of the insulating layer 13 of the conductor.

The spacer 19 may be provided in the form of wire, or may be provided in the form of a protrusion on the outer surface of the insulating layer 13 of the conductor or the inner surface of the cooling tube 17.

When the spacer 19 is provided, surface contact between the outer surface of the insulating layer 13 of the conductor and the inner surface of the cooling tube 17 may be prevented and thus a cooling effect using the cooling fluid may be maximized.

Due to the above configuration, according to the present invention, all surfaces of an insulating layer of a conductor may be cooled to minimize a cooling variation in each region of a surface of the insulating layer, compared with technology of placing a separate cooling pipe in a charging cable, and an insulating conductor is disposed in a cooling channel to provide a cooling function using a cooling fluid and minimize a thickness of an electric vehicle charging cable.

Although in the embodiment of FIG. 3, the spacer 19 of the power unit 10 is in the form of annular wire and is cross-wound spirally along an outer circumferential surface of the conductor, the spacer 19 is not limited thereto, provided contact between the conductor and the cooling tube can be prevented. That is, the spacer 19 may be provided in the form of a plurality of protrusions protruding from the outer surface of the insulating layer of the conductor or the inner surface of the cooling tube.

In addition, heat may be more effectively discharged by forming warm current from the flow of the cooling fluid by the spacer 19.

Thus, in an electric vehicle charging cable according to the present invention, a conductor is placed inside a cooling tube with a cooling channel through which a cooling fluid flows not to be in contact with an inner surface of the cooling tube, thereby maximizing cooling performance of the conductor that generates heat.

That is, in the electric vehicle charging cable of the present invention, the conductor is disposed in the cooling tube with the cooling channel through which the cooling fluid flows not to be in contact with the inner surface of the cooling tube, so that all the surfaces of the insulating layer of the conductor that generates heat may be cooled to maximize the cooling performance of the conductor.

The spacer 19 and the cooling tube 17 are preferably formed of a material having excellent heat resistance and oil resistance. The material may include polytetrafluoro ethylene (PTFE) or urethane or may be formed of general resin or polyethylene and coated with fluorinated polyethylene or the like.

Fluorinated polyethylene may be, for example, a Teflon-based material. Teflon has excellent heat resistance at a temperature ranging from −60° C. to +250° C. Therefore, when the Teflon-based material is used, external heat transmission causing a user's discomfort or anxiety may be minimized, and internal heat transmission may be also minimized during a sheath coating process or the like to prevent melting of inner components, thereby ensuring insulation performance.

For the same purpose, an additional insulating layer 60 may be provided to block heat generated in the cable from being transmitted to the outside.

The additional insulating layer 60 may be formed of a Teflon-based material having excellent heat resistance, similar to the cooling tube, or formed of a fiber braided body having low thermal conductivity and high flexibility.

Figure 4:
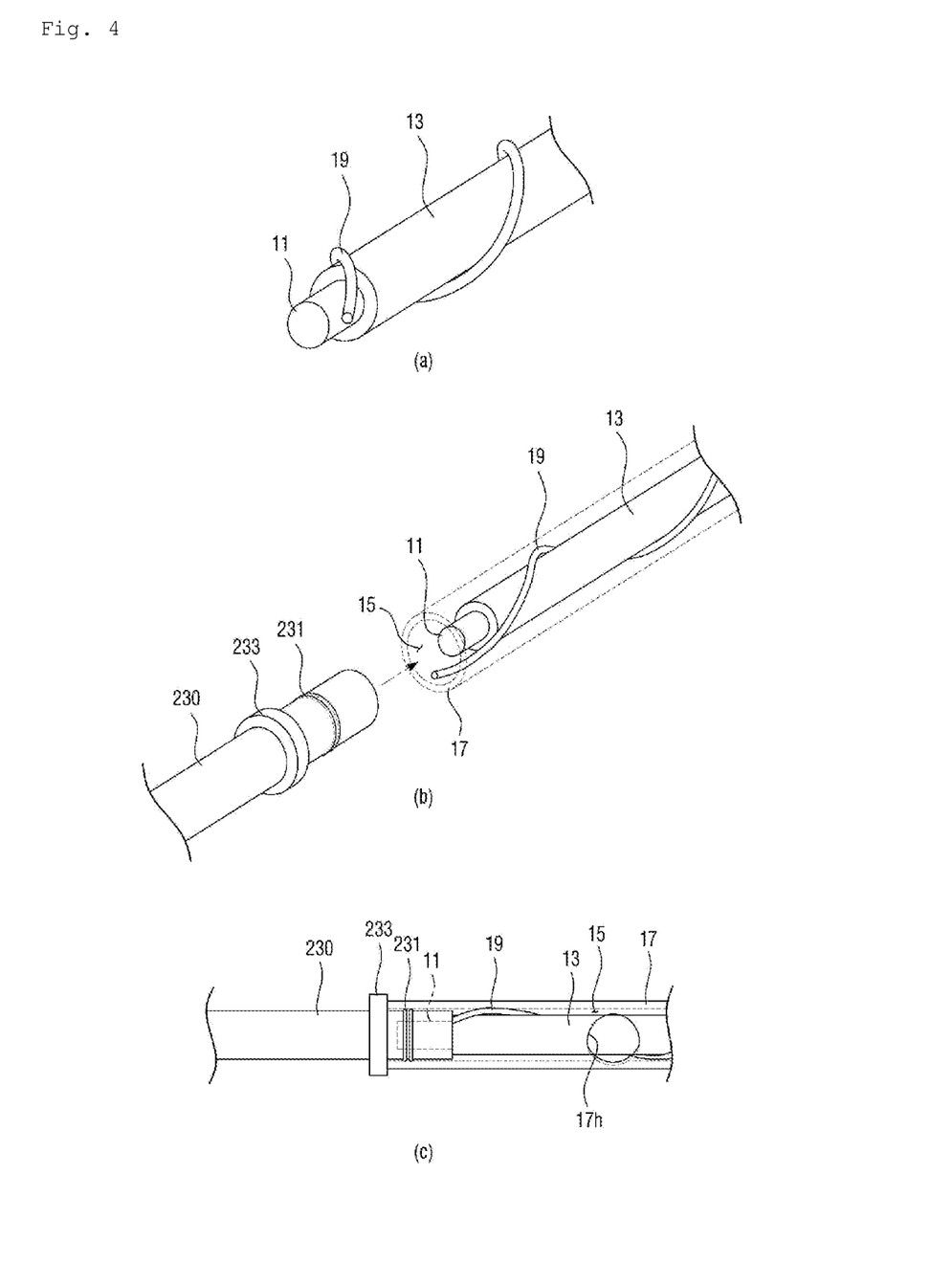
FIGS. 4(a), 4(b), and 4(c) illustrate a structure of a power unit of an electric vehicle charging cable according to the invention and a process of assembling a conductor part of a charger connector.

FIGS. 4(*a*), 4(*b*), and 4(*c*) illustrate the structure of the power unit 10 of the electric vehicle charging cable 100 according to the present invention and a process of assembling a conductor part 230 of the charger connector 200.

The power unit 10 of the electric vehicle charging cable 100 according to the present invention supplies power via the conductor 11 with the insulating layer 13.

As illustrated in FIG. 4(*b*), the conductor 11 with the insulating layer 13 may be accommodated in the cooling tube 17 having a pipe shape. The spacer 19 is provided on an outer side of the insulating layer 13 to prevent contact between an outer surface of the insulating layer 13 and the inner surface of the cooling tube 17. As illustrated in FIGS. 4(*a*) and 4(*b*), the spacer 19 may be in the form of annular wire and be installed by being spirally cross-wound about the outer circumferential surface of the insulating layer 13 covering the conductor.

The spacer 19 is not limited to the form of annular wire, and may be in the form of a protrusion integrally protruding from the outer surface of the insulating layer 13 of the conductor 11 or the inner surface of the cooling tube 17.

As illustrated in FIG. 4(*b*), the conductor part 230 of the charger connector 200 may be attached to an end of the electric vehicle charging cable 100. The conductor part 230 is a component of the charger connector 200 and is connected to the conductor of the power unit 10 of the electric vehicle charging cable 100 according to the present invention.

The conductor part 230 of the charger connector 200 may have an insertion structure into which the conductor 11 of the power unit 10 of the electric vehicle charging cable 100 may be inserted.

That is, the connector part 230 of the charger connector 200 may be configured to be inserted into the cooling tube 17 of the power unit 10 of the electric vehicle charging cable 100 and to allow the conductor of the power unit 10 to be inserted into a side thereof while being inserted into the cooling tube 17.

The connector part 230 of the charger connector 200 may include a flange 233 for limiting a depth of insertion into the cooling tube 17, and at least one pressing protrusion 231 protruding beyond an inner diameter of the cooling tube 17 in a circumferential direction to stably maintain the insertion into the cooling tube 17 and prevent leakage of the cooling fluid. A state in which the connector part 230 of the charger connector 200 is interference-fitted into the cooling tube 17 of the power unit 10 of the electric vehicle charging cable 100 may be stably maintained by the pressing protrusion 231.

When there is a risk of leakage of a refrigerant, a metal sleeve may be put on the pressing protrusion 231 to press down the cooling tube 17 more heavily to maintain a watertight state.

In addition, a fluid circulation hole 17*h* may be provided near an end of the cooling tube 17 to which the conductor portion 230 of the charger connector 200 is attached so as to form the cooling channel 15 of the cooling fluid.

As described above, the electric vehicle charging cable 100 of the present invention includes the pair of power units 10*a* and 10*b*. Each of the power units 10 includes the cooling channel 15. The electric vehicle charging cable 100 is cooled by forming the cooling channels 15 such that the cooling fluid is supplied to the charger connector 200 via the cooling channel 15 of one of the power units 10*a* and 10*b* and collected to the electric vehicle charger 300 via the cooling channel 15 of the other power unit 10.

Thus, for communication between the cooling channels 15 of the cooling tubes 17 of the power units, the fluid circulation holes 17*h* of the cooling fluid may be formed in the cooling tubes 17 near an end region of the electric vehicle charging cable 100, i.e., a region for connection of the charger connector 200, to circulate the cooling fluid via the fluid circulation holes 17*h*.

Figure 5:
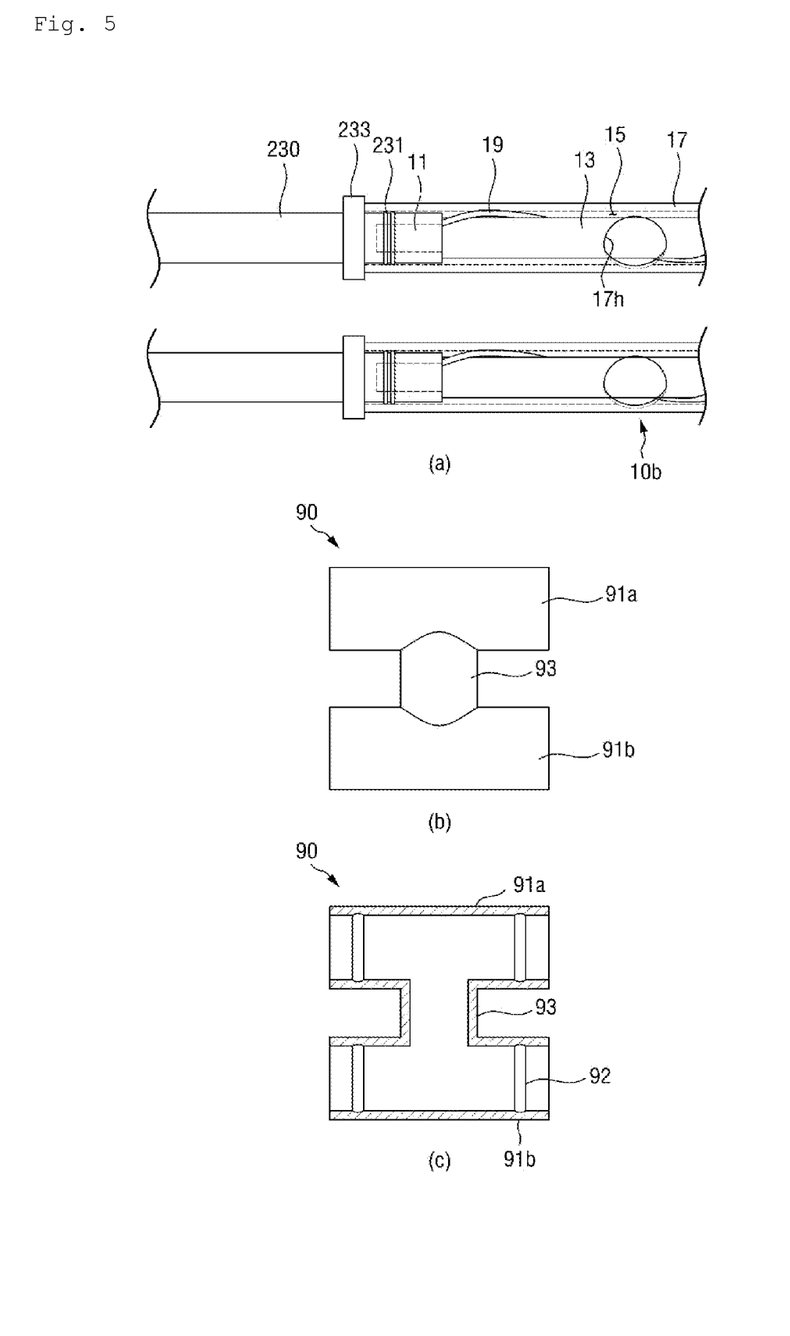
FIGS. 5(a), 5(b), and 5(c) illustrate a pair of power units and a fluid bridge, for circulation of a cooling fluid, of an electric vehicle charging cable according to the present invention.

FIGS. 5(*a*), 5(*b*), and 5(*c*) illustrate a pair of power units 10*a* and 10*b* and a fluid bridge 90, for circulation of a cooling fluid, of an electric vehicle charging cable 100 according to the present invention.

As illustrated in FIG. 5(*a*), the cooling tubes 17 of the pair of power units 10*a* and 10*b* include fluid circulation holes 17*h* at corresponding positions in a lengthwise direction of the electric vehicle charging cable 100. Each of the power units 10 is connected to the fluid bridge 90 having an H shape.

The fluid bridge 90 includes through-parts 91*a* and 91*b* configured to accommodate the cooling tubes 17 of the power units 10 to pass therethrough, and a connection part 93 configured to connect the through-parts 91*a* and 91*b* in a vertical direction. A refrigerant may be circulated through the connection part 93.

Because the fluid bridge 90 is attached with a power unit and used to exchange cooling fluids, the fluid bridge 90 is preferably disposed as close to a charger connector as possible to ensure a cooling effect of the entire cable. In detail, the fluid bridge 90 is preferably disposed inside a housing of a charger connector. Because parts connected via the fluid bridge 90 are provided with fluid circulation holes or the like and thus should be prevented from being bent, the fluid bridge 90 needs to be disposed inside the housing of the charger connector.

As illustrated in a cross-sectional view of the fluid bridge 90 of FIG. 5(c), the through-parts 91a and 91b of the fluid bridge 90 in which the cooling tubes 17 are accommodated to pass therethrough may include O-ring mounting grooves 92, for mounting of O-rings, at positions near the fluid circulation holes 17h. The O-ring mounting grooves 92 may be grooves formed in inner circumferential surfaces of the through-parts 91a and 91b in a direction perpendicular to a path-through direction of the cooling tubes 17.

O-rings formed of a flexible material may be inserted into the O-ring mounting grooves 92 to prevent leakage of the cooling fluid. Alternatively, a sealing effect may be obtained by forming protrusions on the inner circumferential surfaces of the through-parts 91a and 91b, similar to the pressing protrusions on the conductor parts 230, and removing a clearance between the through-parts 91a and 91b and the cooling tubes 17.

Figure 6:
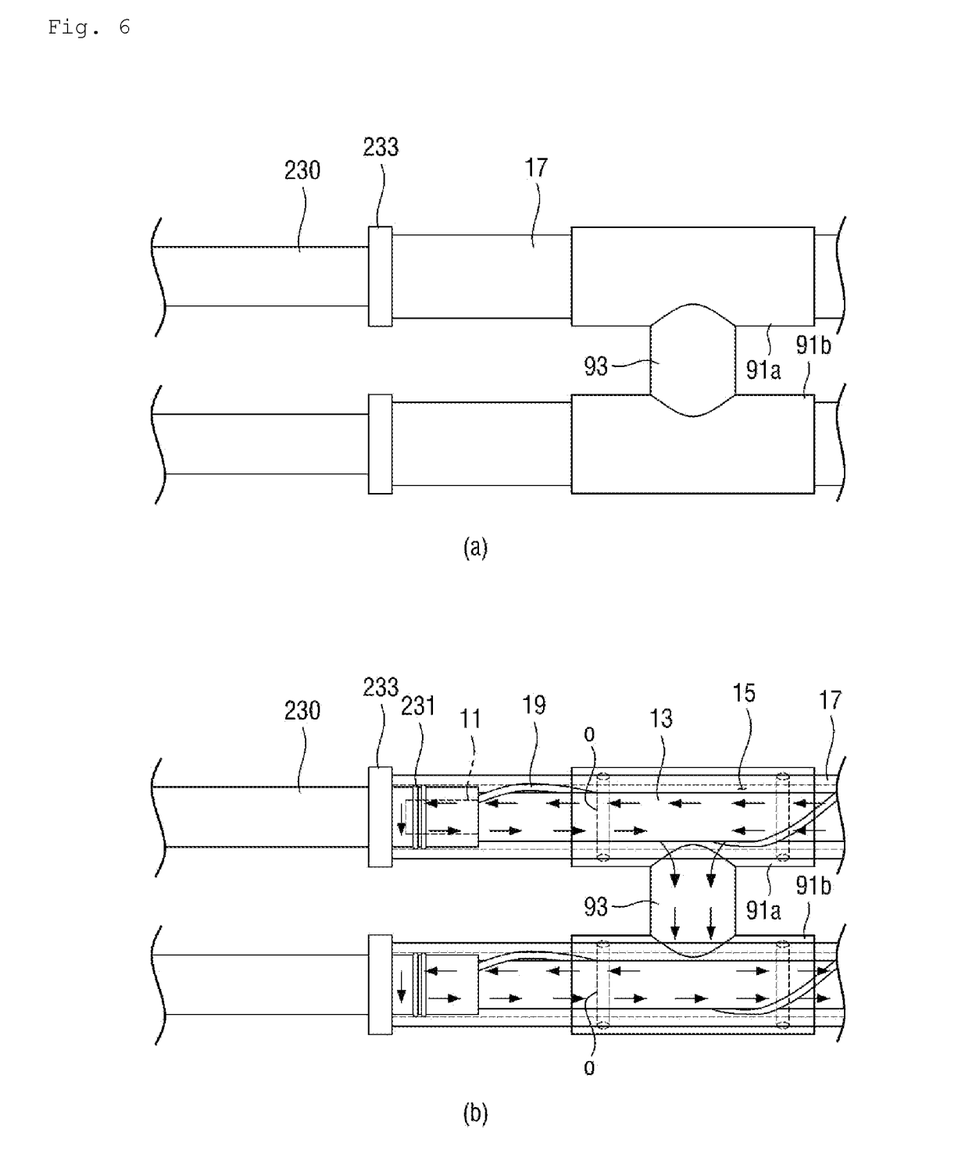
FIGS. 6(a) and 6(b) illustrate an assembled state of a pair of power units and a fluid bridge of an electric vehicle charging cable according to the present invention, and a state in which a cooling fluid flows in the electric vehicle charging cable.

FIGS. 6(a), 6(b), and 6(c) illustrate an assembled state of the pair of power units 10a and 10b and the fluid bridge 90 of the electric vehicle charging cable 100 according to the present invention.

As illustrated in FIG. 6(a), when the power units 10 are arranged to pass through the through-parts 91a and 91b of the fluid bridge 90 and the fluid circulation holes 17h of the cooling tubes 17 of the power units 10 are provided in a direction toward the connection parts 93 of the fluid bridge 90, a cooling fluid supplied via one of the cooling tubes 17 may flow and circulate through the fluid circulation hole 17h of the cooling tube 17, the connection parts 93 of the fluid bridge 90, and the fluid circulation hole 17h of the other cooling tube 17. This means that the cooling fluid used for cooling may be collected to the electric vehicle charger 300 supplying the cooling fluid.

In addition, as illustrated in FIG. 6(b), a refrigerant supplied from the electric vehicle charger 300 via one of the power units 10 and used to cool the conductor of the power unit 10 may be collected to the cooling tube 17 of the other power unit 10, be used to cool the conductor therein, and then be collected to the cooling device of the electric vehicle charger 300 or the like.

As illustrated in the cross-sectional view of FIG. 6(b), because the connection part 93 of the fluid bridge 90 is positioned to connect the centers of the through-parts 91a and 91b, the cooling fluid supplied to one of the cooling tubes 17 may circulate to a rear end of the connector part 230 of the electric vehicle connector 400 and then be supplied to the other cooling tube 17 via the fluid circulation hole 17h. Thus, the connector part 230 of the charger connector 200 may be also cooled through a cooling effect obtained using the cooling fluid.

As described above, because the fluid bridge 90 may be provided inside the housing of the charger connector, airtightness of parts connected through the fluid bridge 90 may be stably ensured.

In addition, as described above, the O-Rings may be inserted into the through-parts 91a and 91b which the cooling tubes 17 pass through to improve airtightness between the inner circumferential surfaces of through-parts 91a and 91b of the fluid bridge 90 and the outer circumferential surfaces of the cooling tubes 17, thereby preventing leakage of the cooling fluid. The number or positions of the O-rings mounted into the through-parts 91a and 91b may be changed.

When the temperature of the cooling fluid is sufficiently low or a flow rate thereof is sufficient, the power unit 10 to which the cooling fluid is supplied and the power unit 10 to which the cooling fluid is collected may be sufficiently cooled, because a variation between a temperature at which the cooling fluid is supplied and a temperature at which the cooling fluid is collected is not large.

In addition, because there may be a variation in cooling load of the electric vehicle charging cable 100 according to a season or the frequency of use of a charger, an optimum cooling effect may be achieved according to the cooling load by adjusting the temperature and flow rate of the cooling fluid to be supplied, based on the temperature of the collected cooling fluid.

While the present invention has been described above with respect to exemplary embodiments thereof, it would be understood by those of ordinary skilled in the art that various changes and modifications may be made without departing from the technical conception and scope of the present invention defined in the following claims. Thus, it is clear that all modifications are included in the technical scope of the present invention as long as they include the components as claimed in the claims of the present invention.

The invention claimed is:

1. An electric vehicle charging cable comprising:
   a grounding unit;
   at least one communication unit;
   a pair of power units each comprising:
      a conductor with an insulating layer;
      a cooling tube in which the conductor is accommodated and a cooling fluid flows in a predetermined direction; and
      a spacer provided between the conductor and an inner surface of the cooling tube to prevent contact between the insulating layer of the conductor and the inner surface of the cooling tube, while the conductor is accommodated in the cooling tube; and
   an outer jacket covering the grounding unit, the communication unit, and the power units.

2. The electric vehicle charging cable of claim 1, wherein the spacer of the power unit is in the form of annular wire and is cross-wound spirally along an outer circumferential surface of the insulating layer of the conductor.

3. The electric vehicle charging cable of claim 1, wherein the spacer of the power unit comprises a plurality of protrusions protruding from an outer surface of the insulating layer of the conductor or the inner surface of the cooling tube.

4. The electric vehicle charging cable of claim 1, wherein at least one of the cooling tube or the spacer is formed of a Teflon-based material or a urethane material.

5. The electric vehicle charging cable of claim 1, wherein the cooling fluid flowing through the cooling tubes of the power units is supplied toward a charger connector attached to an end of the electric vehicle charging cable via the cooling tube of one of the pair of power units, and collected near the charger connector via the cooling tube of the other power unit.

6. The electric vehicle charging cable of claim 5, wherein the cooling tubes of the pair of power units comprise fluid circulation holes at corresponding positions near the charger connector,
   wherein the cooling fluid is collected through a fluid bridge connecting the fluid circulation holes.

7. The electric vehicle charging cable of claim 6, wherein the fluid bridge comprises:

parallel through-parts configured to accommodate the cooling tubes of the pair of power units to pass therethrough; and a connection part configured to connect the parallel through-parts for communication between the fluid circulation holes.

8. The electric vehicle charging cable of claim 1, wherein the conductor is configured to be inserted into a conductor part of a charger connector.

9. An electric vehicle charging cable comprising:
a grounding unit;
a pair of conductors each including an insulating layer;
a pair of cooling tubes each covering one of the conductors not to be contact with the conductors, wherein a cooling fluid flows and circulates in the pair of cooling tubes; and
a fluid bridge configured to connect the pair of cooling tubes to supply the cooling fluid supplied via one of the pair of cooling tubes to the other cooling tube.

10. The electric vehicle charging cable of claim 9, wherein each of the pair of conductors is accommodated in a corresponding cooling tube among the pair of cooling tubes, and
wherein the electric vehicle charging cable further comprises a spacer between each of the pair of conductors and the corresponding cooling tube.

11. The electric vehicle charging cable of claim 10, wherein at least one of the spacer or the cooling tube is formed of polytetrafluoro ethylene (PTFE).

12. The electric vehicle charging cable of claim 10, wherein at least one of the spacer or the cooling tubes is formed of a general resin or polyethylene and coated with fluorinated polyethylene.

13. The electric vehicle charging cable of claim 9, wherein each of the conductors is inserted into a conductor part of a charger connector attached to an end of the electric vehicle charging cable, and
wherein the fluid bridge is disposed in a housing of the charger connector.

14. The electric vehicle charging cable of claim 13, wherein the cooling fluid supplied from an electric vehicle charger is supplied toward the charger connector via one of the pair of cooling tubes, supplied to the other cooling tube via the fluid bridge, and collected to the electric vehicle charger.

15. The electric vehicle charging cable of claim 14, wherein the pair of cooling tubes comprise fluid circulation holes at corresponding positions near the charger connector, and
wherein the fluid bridge comprises:
parallel through-parts configured to accommodate the pair of cooling tubes to pass therethrough; and
a connection part configured to connect the parallel through-parts for communication between the fluid circulation holes.

16. The electric vehicle charging cable of claim 10, wherein the spacer is in the form of annular wire and is cross-wound spirally about an outer side of the insulating layer of the conductor.

* * * * *